United States Patent [19]

Sakamoto

[11] 4,161,001
[45] Jul. 10, 1979

[54] VIDEO SIGNAL REPRODUCING APPARATUS WITH A MANUALLY CONTROLLED TRACK SEARCHING ARRANGEMENT

[75] Inventor: Hitoshi Sakamoto, Zama, Japan

[73] Assignee: Sony Corporation, Tokyo, Japan

[21] Appl. No.: 810,862

[22] Filed: Jun. 28, 1977

[30] Foreign Application Priority Data

Jul. 5, 1976 [JP] Japan ................................. 51-79705

[51] Int. Cl.$^2$ ....................... H04N 5/78; G11B 27/02; G11B 15/46
[52] U.S. Cl. ........................................ 360/10; 360/14; 360/84
[58] Field of Search ........................................ 360/9–10, 360/14, 72, 73, 70, 84

[56] References Cited

U.S. PATENT DOCUMENTS

| | | | |
|---|---|---|---|
| 2,885,485 | 5/1959 | Eigen | 360/13 |
| 2,907,819 | 10/1959 | Perilhou | 360/22 |
| 3,095,473 | 6/1963 | Roizen | 360/14 |
| 3,364,306 | 1/1968 | Brown | 360/14 |
| 3,869,709 | 3/1975 | Yamagishi et al. | 360/10 |
| 4,040,098 | 8/1977 | Beeson et al. | 360/14 |

Primary Examiner—Raymond F. Cardillo, Jr.
Attorney, Agent, or Firm—Lewis H. Eslinger; Alvin Sinderbrand

[57] ABSTRACT

An apparatus for reproducing video signals recorded in successive parallel tracks extending obliquely across a magnetic tape uses at least one rotary magnetic head which scans the tracks in succession at a rate dependent on the speed at which the tape is moved longitudinally by a tape transport assembly, and is provided with a track searching arrangement which includes a manually rotatable wheel and a control circuit for regulating the speed and direction of movement of the tape by the tape transport assembly in dependence on the speed and direction of rotation of the manually rotatable wheel. In response to relatively slow-speed rotation of the wheel within a first speed range, the speed of movement or transport of the tape is varied continuously in proportion to speed of rotation of the wheel. For rotation of the wheel at speeds within successively increased speed ranges, the tape is moved or transported, preferably only by driving of the supply and take-up reels therefor, at successively increased, substantially constant respective speeds having successively increased ratios to the corresponding speeds of rotation of the wheel.

15 Claims, 8 Drawing Figures

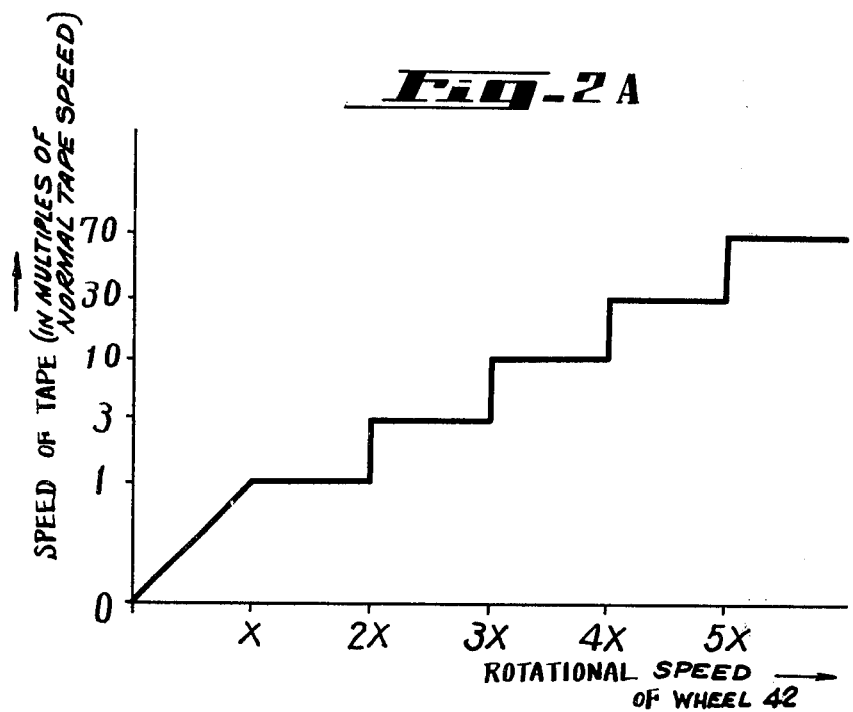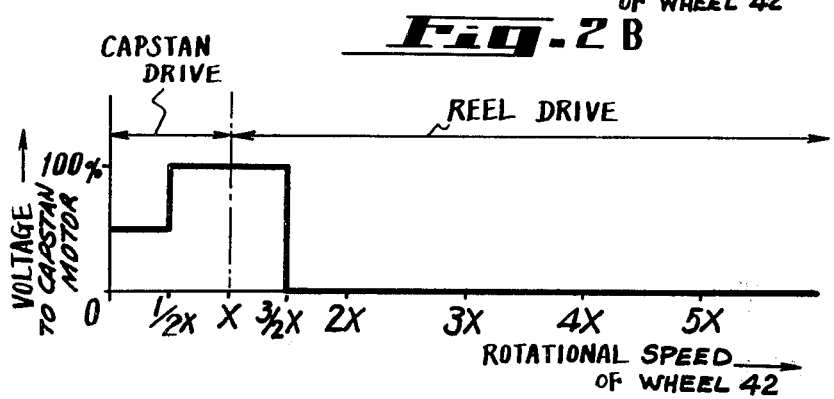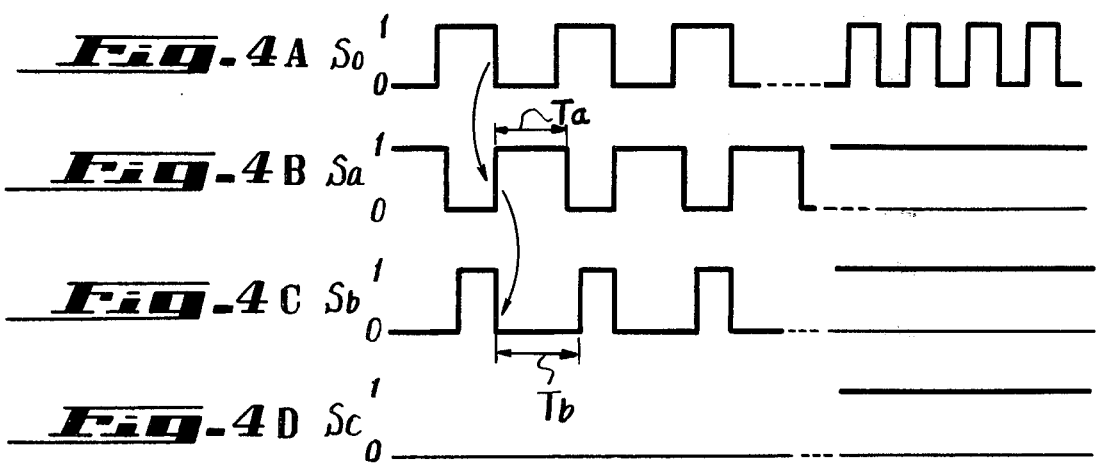

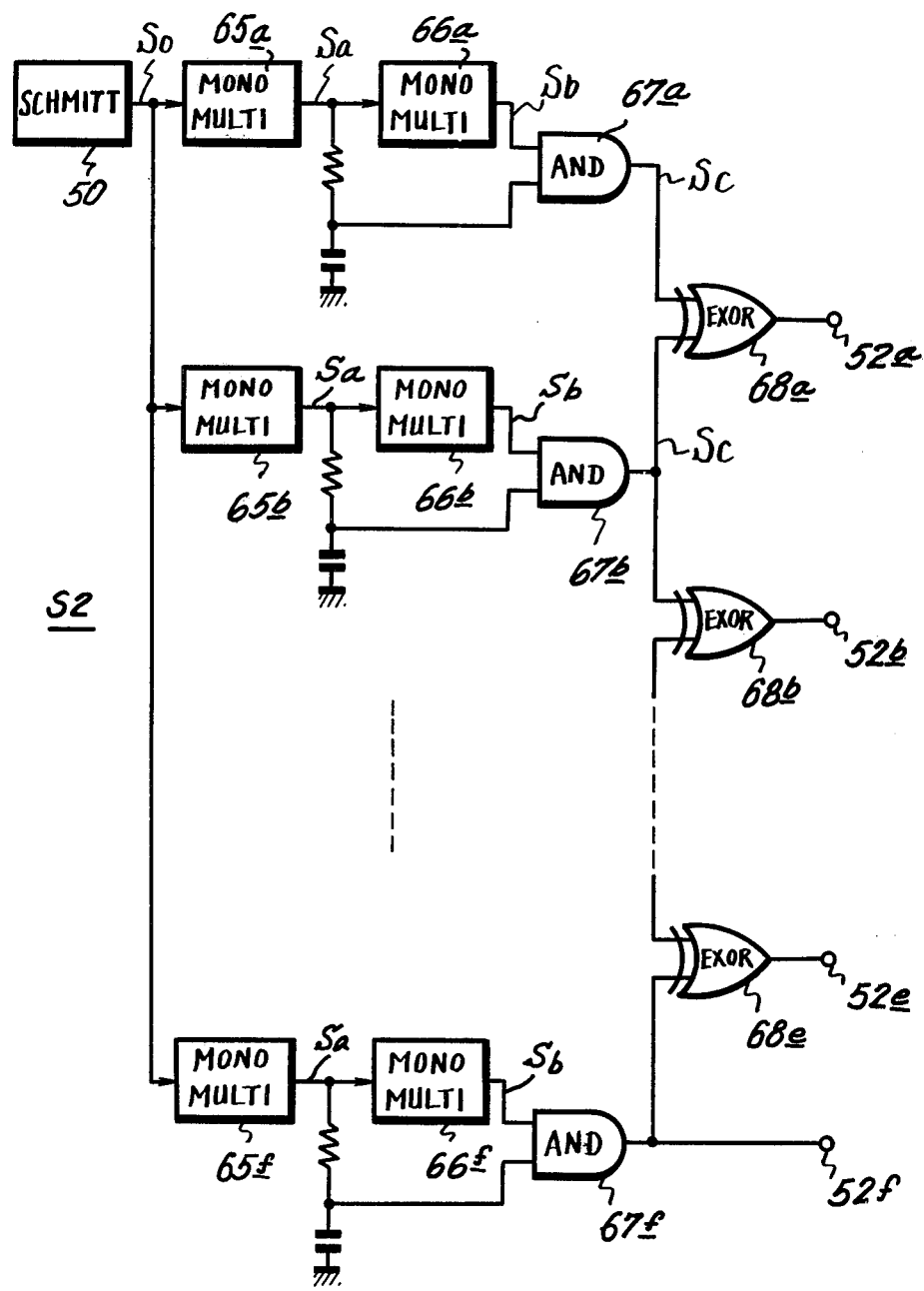

VIDEO SIGNAL REPRODUCING APPARATUS WITH A MANUALLY CONTROLLED TRACK SEARCHING ARRANGEMENT

BACKGROUND OF THE INVENTION

1. Field of the Invention

This invention relates generally to apparatus for reproducing video signals recorded in successive parallel tracks, for example, extending obliquely, on a magnetic tape by means of at least one rotary magnetic head which scans the tracks in succession at a rate dependent on the speed at which the tape is moved longitudinally by a tape transport assembly, and more particularly is directed to providing such apparatus with an improved track searching arrangement by which the tape can be accurately and rapidly positioned for scanning of a selected track by the rotary head or heads.

2. Description of the Prior Art

When an existing magnetic video tape recorder of the helical scan type (VTR) is operated in its reproducing or playback mode with a time base corrector, the speed at which the tape is transported or moved longitudinally between the supply and take-up reels may be varied while the rotary magnetic heads are rotated at the frame frequency so as to provide, on a monitor, a still, slow-motion or fast-motion reproduced picture in dependence on the speed of movement of the tape. Existing VTRs have been provided with a manually actuable control lever or knob for controlling the speed and direction of movement of the tape in dependence on the extent and direction, respectively, of the angular displacement of the control lever or knob from a neutral position at which movement of the tape is halted. A VTR provided with the foregoing so-called "joy stick" control may be used for arbitrarily selecting a particular track on the tape at which a reproducing or recording operation is to be commenced, as during editing of the tape. Although the high speed movement of the tape in one director or the other can be effectively achieved by a corresponding large angular displacement of the control lever or knob from its neutral position so as to bring a roughly desired portion of the tape to the position for scanning of the tracks thereon by the rotary heads, difficulty is experienced in using the existing joy-stick control to thereafter position a single selected track for scanning by the rotary heads, as for still-picture reproduction or for the commencement of an editing operation, or when a sequence of still pictures are to be reproduced one after the other at a slow rate. Since the joystick control only controls the speed at which the tape is moved in dependence on the angular displacement of the control lever or knob from its neutral position, repeated to and fro displacements of the control lever or knob are required to dispose a selected track for scanning by the rotary heads and, even then, it is difficult to stop the tape with the selected track precisely positioned for scanning by the heads.

OBJECTS AND SUMMARY OF THE INVENTION

Accordingly, it is an object of this invention to provide a video signal reproducing apparatus with a track searching arrangement by which an arbitrarily selected track on the magnetic tape may be accurately and rapidly positioned for scanning by the rotary head or heads.

More particularly, it is an object of this invention to provide a track searching arrangement, as aforesaid, by which the tape can be moved at high speed in either direction for bringing a selected portion of the tape to a position for scanning by the rotary head or heads of the video signal reproducing apparatus, or the tape can be moved relatively slowly at a precisely controlled speed and brought to rest with any selected track accurately positioned for scanning by the rotary head or heads.

Still another object is to provide a track searching arrangement, as aforesaid, by which successive fields of still pictures can be reproduced one after the other at any rate desired by the operator.

In accordance with an aspect of this invention, an apparatus for reproducing video signals recorded in successive parallel tracks on a magnetic tape by means of at least one rotary magnetic head which scans the tracks in succession at a rate dependent on the speed at which the tape is moved longitudinally by a tape transport assembly, it is provided with a track searching arrangement which includes a manually rotatable wheel and control means for regulating the speed and direction of movement of the tape by the transport assembly in dependence on the speed and direction of rotation of the manually rotatable wheel.

In a preferred embodiment of the invention, in response to relatively slow speed rotation of the manually rotatable wheel within a first speed range, the speed of movement of the tape is varied continuously in proportion to the speed of rotation of the wheel, whereas, in response to rotation of the wheel at speeds within successively increased speed ranges, the tape is moved or transported, preferably only by driving of the supply and take-up reels therefor, at successively increased, substantially constant respective speeds which preferably have successively increased ratios to the corresponding speeds of rotation of the manually rotated wheel.

The above, and other objects, features and advantages of the invention, will be apparent in the following detailed description of an illustrative embodiment which is to be read in conjunction with the accompanying drawings.

BRIEF DESCRIPTION OF THE DRAWINGS

FIG. 2A is a graph illustrating the relation of the rotational speed of a manually rotated wheel included in the track searching arrangement of FIG. 1 to the resulting speed of movement of the tape;

FIG. 2B is a graph illustrating the relation of the speed of rotation of the manually rotated wheel to the operating voltage applied to a capstan drive motor in the apparatus of FIG. 1;

FIG. 3 is a block diagram illustrating a portion of a discriminating circuit that may be employed in the track searching arrangement of FIG. 1; and FIGS. 4A–4D are waveform diagrams to which reference will be made in explaining the operation of the discriminating circuit of FIG. 3.

DETAILED DESCRIPTION OF A PREFERRED EMBODIMENT

Figure 1:
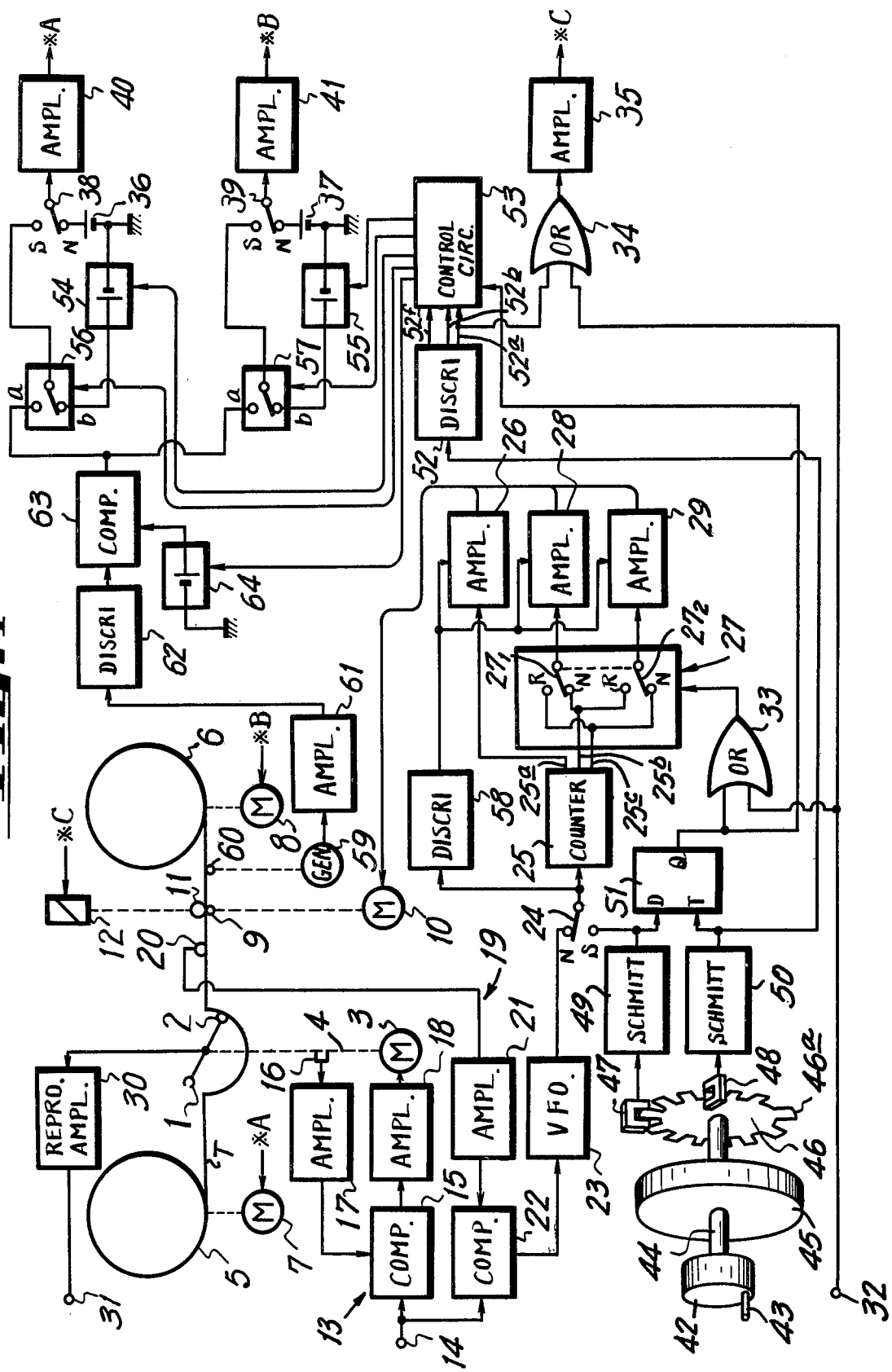
FIG. 1 is a block diagram illustrating a video signal reproducing apparatus provided with a track searching arrangement according to a preferred embodiment of the invention.

Referring to the drawings in detail, and initially to FIG. 1 thereof, an apparatus for reproducing video signals recorded in successive parallel tracks extending obliquely across a magnetic tape T is there shown to include a pair of diametrically opposed rotary magnetic heads 1 and 2 which are rotated at the standard frame frequency of the video signals, for example, at a speed of 30 revolutions per second in the case of NTSC video signals. Such rotation of heads 1 and 2 may be effected, for example, by a three-phase AC motor 3 having its shaft 4 connected to the heads 1 and 2. The tape T is shown to be wound on rotatable supply and take-up reels 5 and 6, and the run of tape T between reels 5 and 6 is suitably guided so as to extend helically around approximately one-half of the periphery of a guide drum (not shown) associated with rotary heads 1 and 2 so that the latter will alternately scan obliquely across the tape. The video reproducing apparatus is further shown on FIG. 1 to have a tape transport assembly including reversible DC motors 7 and 8 coupled with reels 5 and 6 for driving the latter, a capstan 9 engageable with the tape T at a location along the latter between the take-up reel 6 and the position where the tape is alternately scanned by heads 1 and 2, a three-phase hysteresis motor 10 for rotating capstan 9, and a pinch roller 11 which, upon energizing of an associated solenoid 12, is operative to press the tape against capstan 9 for transport of the tape by the rotated capstan.

A servo circuit 13 is provided for controlling the rotation of heads 1 and 2 and is shown to include a terminal 14 which receives vertical synchronizing pulses from an external or reference synchronizing generator (not shown), and from which such vertical synchronizing pulses are applied to a phase comparator 15. A pulse generator 16 is a associated with shaft 4 to provide a pulse at each half-revolution of heads 1 and 2, and each such pulse from generator 16 is applied through a waveform-shaping amplifier 17 to phase comparator 15. Thus, phase comparator 15 provides a compared output in dependence on comparison of the phases of the pulses from generator 16 and the vertical synchronizing pulses from terminal 14, and such compared output is supplied, as a control signal, to a servo amplifier 18 to produce a controlled driving voltage for motor 3. As a result, rotary heads 1 and 2 are rotated in synchronism with the vertical synchronizing pulses applied to terminal 14.

As is usual, one field of video signal information may be recorded in each of the successive parallel tracks extending obliquely across tape T and, simultaneously with such recording of the video signals, track control pulses (CTL) are suitably recorded along a longitudinal edge of the tape T so as to indicate the positions of the successive parallel tracks along the tape.

In order to ensure that, in the normal reproducing mode of operation, rotary heads 1 and 2 will alternately scan the successive parallel tracks extending obliquely across tape T and thereby reproduce the respective fields of video signal information recorded in such tracks at the same or standard rate employed for the recording thereof, the illustrated apparatus further has a servo circuit 19 for controlling the capstan drive motor 10 in such normal reproducing mode of operation. The servo circuit 19 is shown to include a fixed magnetic head 20 reproducing the track control pulses recorded along an edge of the tape and applying the same, through a waveform-shaping amplifier 21, to a phase comparator 22 which also receives the vertical synchronizing pulses from terminal 14. The output voltage of comparator 22, which varies in accordance with the phase relation of the pulses from head 20 in respect to the vertical synchronizing pulses, is employed to control a voltage-controlled variable frequency oscillator 23 which thus delivers an oscillation signal at a frequency which is suitably increased or decreased in accordance with the phase difference between the vertical synchronizing pulses from terminal 14 and the reproduced control pulses from fixed head 20. The oscillation signal from variable frequency oscillator 23 is applied to a contact N of a switch 24 which is positioned as shown on FIG. 1 in the normal reproducing mode of operation of the apparatus so that the oscillation signal is then applied through switch 24 to a counter 25. The counter 25 is operative to convert the single-phase oscillation signal into a three-phase signal having its phases appearing at respective outputs 25a, 25b and 25c. One of the alternating signals making up such three-phase signal is applied directly from the respective output 25a of counter 25 to an amplifier 26, while the other two alternating signals of the three-phase signal are applied from the respective outputs 25b and 25c of counter 25 to contacts N of switches $27_1$ and $27_2$ included in a switching circuit 27. The switches $27_1$ and $27_2$ are positioned as shown on FIG. 1 in the normal reproducing mode of operation of the apparatus so that the alternating signals or phases from outputs 25b and 25c of counter 25 are applied to amplifiers 28 and 29, respectively. The outputs of amplifiers 26,28 and 29 are applied to three-phase hysteresis motor 10 so that, in the normal reproducing mode of operation, motor 10 drives capstan 9 in the direction for transporting tape T from supply reel 5 to take-up reel 6, with the speed of rotation of capstan 9 being controlled in dependence on the frequency of the oscillation output of oscillator 23. As a result of the foregoing, rotary heads 1 and 2 are made to alternately accurately scan the successive parallel tracks on tape T for reproducing, at the standard rate, the successive fields of video signal information recorded in such tracks and applying the same through a reproducing amplifier 30 to an output terminal 31 which may have a suitable monitor (not shown) connected thereto for displaying the corresponding video pictures or images.

When the normal reproducing mode of operation of the apparatus is selected, for example, by manual actuation of a reproducing push-button (not shown), a reproducing mode indicating signal is suitably applied to a terminal 32 and, from the latter, through an OR circuit 33 as a control signal for the switching circuit 27 so as to maintain the switches $27_1$ and $27_2$ of the latter engaged with their respective N contacts, as shown. The reproducing mode indicating signal is further applied from terminal 32 through an OR circuit 34 to an amplifier 35 having its output connected, as indicated at C, to solenoid 12 for energizing the latter and thereby causing pinch roller 11 to press tape T against rotated capstan 9. Furthermore, in the normal reproducing mode of operation, suitable predetermined voltages from DC voltage sources 36 and 37 connected to contacts N of switches 38 and 39 respectively, are applied through such switches to servo amplifiers 40 and 41 having their outputs connected, as indicated at A and B, respectively, to DC motors 7 and 8 for driving the supply and takeup reels 5 and 6. The voltages thus applied from sources 36 and 37 to servo amplifiers 40 and 41 are selected so that motor 8 will be made to drive take-up reel 6 in the direction to wind the tape thereon at a speed corresponding to the speed of advancement of the tape by rotated capstan 9, while motor 7 will be made to drive supply reel 5 in the direction to unwind the tape therefrom at a slightly slower speed, whereby to provide a desired tension in tape T between the reels. The switches 24,38 and 39 may be ganged or connected so as to engage their respective contacts N, as shown in FIG. 1, when the previously mentioned reproducing push-button is actuated to select the normal reproducing mode of operation and to provide the reproducing mode indicating signal at terminal 32.

In accordance with this invention, the above described video signal reproducing apparatus is further intended to have a track searching mode of operation which may be selected, for example, by manual actuation of a respective push-button (not shown) in response to which switches 24, 38 and 39 are changed-over so as to cause their movable contacts to disengage the respective contacts N and engage the respective contacts S. In order to control the movement of tape T in the track searching mode of operation, the apparatus embodying this invention is shown to include a manually rotatable wheel 42 conveniently provided with a crank handle 43 and being mounted on a shaft 44 which is journalled in substantially friction-free bearings (not shown) and which further preferably carries a fly-wheel 45 having a substantial moment of inertia, for example, from several hundred to several thousand gcm$^2$. By reason of the substantially friction-free mounting of shaft 44 and the substantial moment of inertia of fly-wheel 45 on such shaft, shaft 44 may be brought up to any selected speed of rotation by manual rotation of wheel 42, and thereafter, upon release of the wheel 42, shaft 44 will continue to free-wheel substantially at such speed for an extended period of time or until rotation of the shaft is slowed or halted by manual grasping of wheel 42. A photo-disk 46 is further shown to be secured on shaft 44 for rotation with the latter, and the periphery of disk 46 is formed with spaced apart cutouts defining a substantial number, for example 120, of radially directed light shielding portions 46a between the successive cutouts.

Two angularly spaced apart photo-couplers 47 and 48 are associated with photo-disk 46 so as to constitute first and second signal generating means providing first and second pulse signals of different phases at a frequency dependent on the speed of rotation of wheel 42, with the phase relation of such first and second pulse signals being dependent on the direction of rotation of wheel 42. More particularly, each of the photo-couplers 47 and 48 may include a light source at one side of the plane of rotation of disk 46 directing a light beam across the peripheral portion of disk 46 toward a respective photo-cell or other light-receiving element at the opposite side of such plane of rotation. Thus, when disk 46 is rotated, the light beam emitted from the light source and directed toward the respective photocell is intermittently blocked by the successive light shielding portions 46a of disk 46, with the result that each of the photo-couplers 47 and 48 provides an alternating signal or pulses at a frequency corresponding to the rotational speed of disk 46. Furthermore, the angular spacing between photo-couplers 47 and 48 is selected so that the alternating signals or pulses constituting the outputs from photo-couplers 47 and 48 will have a phase difference of 90° therebetween. The alternating or pulse signals from photo-couplers 47 and 48 are applied to Schmitt circuits 49 and 50, respectively, to be wave-shaped by the latter into corresponding rectangular wave signals. The purpose of the Schmitt circuits 49 and 50 is to prevent the transmission through subsequent components of the circuit of irregularities in the pulse signals from photo-couplers 47 and 48 that would result from wavering in the rotation of photo-disk 46 caused by uneven manual rotation of wheel 42.

The rectangular wave signal from Schmitt circuit 49 is applied to contact S of switch 24 so as to constitute the input to counter 25 in the track searching mode of operation of the apparatus. Further, the rectangular wave signals from Schmitt circuits 49 and 50 are respectively applied to D and T inputs of a D-type flip-flop 51 which functions as means for detecting the direction of rotation of manually rotatable wheel 42. For example, flip-flop 51 may provide signal levels "0" and "1" at its output Q in response to turning of manually rotatable wheel 42 in the clockwise and counter-clockwise directions, respectively. The signal from output Q of flip-flop 51 is applied to another input of OR circuit 33 so that, for example, when such output signal is at the level "1", the resulting output of OR circuit 33 causes switching circuit 27 to adopt the illustrated condition corresponding to forward movement or transport of tape T from supply reel 5 to take-up reel 6, whereas, when the output signal from flip-flop 51 is at the level "0", switching circuit 27 is changed-over thereby so as to cause switches 27$_1$ and 27$_2$ to engage their respective contacts R. Contacts R of switches 27$_1$ and 27$_2$ are shown to be connected to the outputs 25c and 25b, respectively, of counter 25, so that the change-over of switching circuit 27 in response to the "0" output from flip-flop 51 causes the reversal of the direction of rotation of capstan drive motor 10 with the result that tape T is moved or transported in the reverse direction from take-up reel 6 to supply reel 5 so long as pinch roller 11 is pressed against capstan 9 by energizing of solenoid 12. It will be apparent that the frequency of the amplified three-phase signal applied from amplifiers 26,28 and 29 to three-phase hysteresis motor 10 is proportional to the frequency of the rectangular wave signal applied from Schmitt circuit 49 to counter 25 in the track searching mode of operation, so that the speed of rotation of motor 10 is continuously proportional to the speed of rotation of wheel 42 at least in a first range of the rotational speed of wheel 42, as hereinafter described. It will further be apparent that the sequence of the phases of the three-phase signal applied by amplifiers 26,28 and 29 motor 10, and hence the direction of rotation of motor 10, is determined by the direction of rotation wheel 42 in the track searching mode of operation.

The rectangular wave signal from Schmitt circuit 50 is further shown to be supplied to a frequency discriminator 52 which may be in the form of a frequency-to-voltage converter as hereinafter described in detail, and which provides an output signal at a first output 52a only when the frequency of the rectangular wave signal from Schmitt circuit 50 corresponds to a speed of rotation of wheel 42 in a first speed range of 0 to X revolutions per second. For example, the upper limit X of the first speed range of manually rotatable wheel 42 may be 1.75 revolutions per second and, by suitable selection of the number of light shielding portions 46a on disk 46 and of counter 25, such upper limit X of the first speed range may be made to correspond to a rotational speed of motor 10 causing capstan 9 to drive tape T at the standard speed for the recording and normal reproducing modes of operation of the apparatus. The output 52a from frequency discriminator 52 is applied through OR circuit 34 to amplifier 35 so that solenoid 12 is energized to cause movement of tape T by rotated capstan 9 in the track searching mode of operation only when the speed of rotation of wheel 42 is in the first speed range from 0 to X.

The output 52a and other outputs 52b–52f from frequency discriminator 52 respectively appearing when the speed of rotation of wheel 42 is in respective speed ranges successively greater than the first range 0 to X, for example, the speed ranges X to 2X, 2X to 3X, 3X to 4X, 4X to 5X and greater than 5X, as indicated on FIG. 2A, are applied to a control circuit 53 which also receives the direction-indicating output Q of flip-flop 51. The control circuit 53 responds to the selectively applied outputs 52a–52f from frequency discriminator 52 and the direction indicating output of flip-flop 51 to suitably control variable DC voltage sources 54 and 55 and associated switching circuits 56 and 57. More particularly, so long as the output of frequency discriminator 52 indicates that the speed of rotation of wheel 42 is within the first speed range 0 to X, control circuit 53 maintains switching circuits 56 and 57 in their illustrated positions where they engage the respective contacts b. Thus, in the track searching mode of operation, at which time switches 38 and 39 are changed-over to engage their respective contacts S, the output voltages of variable DC voltage sources 54 and 55 are applied through contacts b of switches 56 and 57, respectively, and through contacts S of switches 38 and 39, respectively, to servo amplifiers 40 and 41 for correspondingly controlling the speeds and directions of rotation of motors 7 and 8, and hence of reels 5 and 6. Furthermore, when the speed of rotation of wheel 42 is in the first speed range 0 to X, control circuit 53 varies the output voltages of sources 54 and 55 in proportion to such speed of rotation, and also in accordance with the direction of rotation of wheel 42 as indicated by the output of flip-flop 51 applied to control circuit 53. More particularly, with wheel 42 being rotated at a speed within the first speed range 0 to X in the direction for causing forward movement of tape T, control circuit 53 will cause voltage source 55 to provide an output voltage causing reel 6 to be driven in the direction for winding the tape thereon at a speed that is consistent with the speed at which the tape is being driven by rotated capstan 9. At the same time, control circuit 53 will cause voltage source 54 to provide an output voltage by which motor 7 applies a suitable torque to reel 5 for establishing the required tension in tape T between the reels. On the other hand, if wheel 42 is being rotated in the opposite direction at a speed within the first speed range 0 to X for causing reverse movement of tape T at a coresponding relatively slow speed, control circuit 53 causes voltage sources 54 and 55 to provide respective output voltages resulting in the driving of reel 5 in the direction for winding the tape thereon at a speed again corresponding to the speed at which the tape is being driven by capstan 9, and with the required tension again being provided in tape T between the reels.

It will be apparent from the above that, when wheel 42 is rotated at a speed in the first speed range 0 to X in the track searching mode of operation, capstan 9 is effective to move or transport tape T at a speed proportional to the rotational speed of wheel 42 and ranging from 0 to the standard tape speed for recording and normal reproducing operations, with the direction of movement of the tape being dependent upon the direction of rotation of wheel 42.

It will also be seen on FIG. 1 that, in accordance with this invention, the rectangular wave signal from Schmitt circuit 49 is further preferably applied through a contact S of switch 24 to a frequency discriminator 58 providing a gain control output signal for amplifiers 26, 28 and 29. More particularly, as illustrated on FIG. 2B, in the track searching mode of operation, when the rectangular wave signal from Schmitt circuit 49 corresponds to a speed of rotation of wheel 42 which is less than, for example, ½X, the resulting output voltage or gain control signal from frequency discriminator 58 causes the amplifiers 26, 28 and 29 to substantially reduce the respective driving voltages applied to capstan drive motor 10. In other words, when wheel 42 is being rotated at a very slow speed to cause corresponding slow speed operation of motor 10, at which time the frequency of the three-phase signal applied to motor 10 is greatly reduced so as to approach a DC signal, the amplitude or voltage of such three-phase signal applied to capstan drive motor 10 is reduced for preventing burning or other damage to the motor. Further, as shown on FIG. 2B, when the speed of rotation of wheel 42 is greater than ½X, for example, in the range from ½X to 3/2X, frequency discriminator 58 responds to the corresponding frequency of the rectangular wave signal from Schmitt circuit 49 to provide a gain control signal or output voltage causing amplifiers 26, 28 and 29 to provide the full driving voltage for motor 10. Further, as shown, at rotational speeds of wheel 42 above 3/2X, the output of frequency discriminator 58 may cause amplifiers 26, 28 and 29 to be inoperative, thereby to halt the operation of capstan drive motor 10.

When the rotational speed of wheel 42 is greater than X, the output 52a of frequency discriminator 52 is no longer applied to OR circuit 34 so that solenoid 12 is deenergized and, accordingly, pinch roller 11 is separated from capstan 9, whereupon, the movement or transport of tape T is effected only by the rotation of reels 5 and 6 by motors 7 and 8. In order to control the speed and direction of movement of tape T when such movement is effected only by the rotational driving of reels 5 and 6, that is, when the speed of rotation of wheel 42 exceeds X, the reel drive motor circuit is further shown to include a frequency generator 59 driven, for example, by a roller 60 engaging tape T, so as to provide an alternating output signal or pulses at a frequency corresponding to the actual speed of movement of the tape. The alternating output signal from generator 59 is applied through an amplifier 61 to a frequency discriminator or frequency-to-voltage converter 62 which provides a DC output voltage proportional to the speed of movement of tape T. Such DC output voltage from frequency discriminator 62 is applied to one input of a voltage comparator 63 which, at its other input, receives a variable reference DC voltage from a variable DC voltage source 64. The comparator 63 compares the DC voltage from discriminator 62 with the reference DC voltage from voltage source 64 to provide a corresponding or compared output which is applied to contacts a of switching circuits 56 and 57.

When wheel 42 is rotated at a speed in excess of the value X in the direction for effecting forward movement of tape T, control circuit 53 responds to the direction indicating output of flip-flop 51 and to a corresponding speed indicating output of frequency discriminator 52 to cause change-over of switch 57 from the illustrated position to a position engaging its contact a so that the compared output voltage from voltage comparator 53 is then applied through contact a of switch 57 and contact S of switch 39 to servo amplifier 41. At the same time, in response to the speed indicating output of frequency discriminator 52, control circuit 53 suitably controls variable DC voltage source 64 for establishing a predetermined DC voltage applied from the latter to comparator 63, and control cicuit 53 further suitably controls variable DC voltage source 54 for establishing a corresponding DC voltage applied from the latter through contact b of switching circuit 56 and contact S of switch 38 to servo amplifier 40. Thus, when wheel 42 is rotated at a speed exceeding the value X in the direction for causing forward movement of tape T, the rotational speed of motor 8 for rotating take-up reel 6 in the direction winding the tape thereon is servo controlled on the basis of the controlled voltage from variable DC voltage source 64, while motor 7 coupled with supply reel 5 is controlled on the basis of a predetermined voltage from variable DC voltage source 54 so as to exert a predetermined torque producing a desired tension in tape T.

On the other hand, when wheel 42 is rotated at a speed exceeding the value X in the direction for effecting reverse movement of tape T, the direction indicating output of flip-flop 51 causes control circuit 53 to effect change-over of switching circuit 56 from the illustrated condition to the condition in which its movable contact engages contact a, while switching circuit 57 remains in its illustrated condition. Once again, control circuit 53 responds to a corresponding speed indicating output of frequency discriminator 52 so as to cause variable DC voltage source 64 to apply a respective controlled voltage to voltage comparator 63, and further to cause variable DC voltage source 55 to apply a respective controlled voltage to contact b of switching circuit 57. Therefore, when wheel 42 is rotated at a speed exceeding the value X in the direction for effecting reverse movement of tape T, the speed of rotation of motor 7 for rotating supply reel 5 in the direction for rewinding the tape thereon is servo controlled on the basis of the controlled voltage from source 64, while motor 8 coupled with take-up reel 6 is controlled on the basis of the voltage from source 55 to provide a suitable torque for providing the required tension in tape T.

Preferably, in the track searching arrangement according to this invention, the tape T is transported or moved in the direction corresponding to the direction of wheel 42 at successively increased, substantially constant speeds in response to speeds of rotation of wheel 42 in respective speed ranges successively greater than the value X, and such successively increased, substantially constant speeds of movement of the tape have successively increased ratios relative to the corresponding speed of rotation of the wheel. Thus, for example, as shown on FIG. 2A, when the speed of rotation of wheel 42 is anywhere in the range from X to 2X, control circuit 53 causes variable DC voltage source 64 to provide a constant output voltage by which the speed of movement of the tape is maintained at the standard or normal speed for recording and normal reproducing operations. When the speed of rotation of wheel 42 is further increased to be anywhere in the range from 2X to 3X, the constant output voltage of voltage source 64 established by control circuit 53 is suitable to provide a constant speed of tape movement which is, for example, three times the standard speed of tape movement. Similarly, when the speed of rotation of wheel 42 is still further increased to be in the range from 3X to 4X, from 4X to 5X, and greater than 5X, the controlled voltage output from voltage source 64 established by control circuit 53 is suitable to provide speeds of movement of tape T which are, respectively, ten times, thirty times and seventy times the standard speed of movement of the tape.

Referring now to FIG. 3, it will be seen that, in the frequency discriminator 52, the rectangular wave signal $S_o$ (FIG. 4A) obtained from Schmitt circuit 50 and having a frequency corresponding to the rotational speed of wheel 42 is applied to a plurality of monostable multivibrators $65a, 65b, -65f$ corresponding in number to the number of outputs $52a, 52b-52f$ provided from discriminator 52. The multivibrators $65a, 65b-65f$ are of the type that are normally turned OFF and triggered to their ON state or condition at each falling edge of the applied rectangular wave signal $S_o$. Further, the multivibrators $65a, 65b-65f$ have progressively decreased turned-on periods $T_a$. Thus, when the period of the successive pulses of the rectangular wave signal $S_o$ from Schmitt circuit 50 is greater than the turned-on period $T_a$ of, for example, the multivibrator $65a$, that is, when the speed of rotation of wheel 42 is less than the value X, each of the multivibrators $65a, 65b-65f$ will provide an output signal $S_a$ (FIG. 4B) which rises up to the level "1" for the respective turned-on period $T_a$ at each falling down of the signal $S_o$, as illustrated at the left-hand portions of FIGS. 4A and 4B. On the other hand, when the period of signal $S_o$ is reduced, for example, in response to rotation of wheel 42 at a speed in the range from X to 2X, so that the period of signal $S_o$ is shorter than the turned-on period $T_a$ of multivibrator $65a$, then the output of multivibrator $65a$ continuously remains at the relatively high level "1", as illustrated on the right-hand portions of FIGS. 4A and 4B.

The output signals $S_a$ from multivibrators $65a, 65b-65f$ are shown to be applied to monostable multivibrators $66a, 66b-66f$, respectively, which are repeatedly triggered to an OFF condition from a stable ON condition by the rising edges of the respective signals $S_a$, and which have turned-off periods $T_b$ longer than the turned-on periods $T_a$ of the respective multivibrators $65a, 65b-65f$. Thus, if the rectangular wave signal $S_o$ from Schmitt circuit 50 has a period longer than the turned-on period $T_a$ of multivibrator $65a$ so that the latter is intermittently turned-on for the periods $T_a$ thereof, the respective multivibrator $66a$ is turned-off during each period when multivibrator $66a$ is turned-on, as shown on the right-hand portion of FIG. 4C. On the other hand, if the period of the signal $S_o$ is shorter than the turned-on period $T_a$ of multivibrator $65a$ so that the output of the latter is continuously at the high level "1", the output of the respective multivibrator $66a$ also remains continuously at the high level "1", as shown at the right-hand portion of FIG. 4C.

The signals $S_a$ and $S_b$ from multivibrators $65a$ and $66a, 65b$ and $66b, -65f$ and $66f$ are applied to AND circuits $67a, 67b-67f$, respectively. As shown on FIG. 4D, when the period of the rectangular wave signal $S_o$ is longer than, for example, the turned-on period $T_a$ of multivibrator $65a$, the signals $S_a$ and $S_b$ from multivibrators $65a$ and $65b$ are not simultaneously at the high level "1" and, accordingly, the output signal $S_c$ from the respective AND circuit $67a$ remains at the low or "0" level, as shown on the left-hand portion of FIG. 4D. On the other hand, when the period of the signal $S_o$ is shorter than the period $T_a$ of multivibrator $65a$, the output $S_c$ of AND circuit $67a$ is maintained at the relatively high or "1" level, as shown on the right-hand portion of FIG. 4D.

The output signals $S_c$ of AND circuits 67a,67b–67f are connected successively, in pairs, to respective inputs of exclusive OR circuits 68a,68b–68e which are, in turn, respectively connected to the outputs 52a,52b–52e of frequency discriminator 52. The output of AND circuit 67f is also directly connected to the output 52f of the discriminator. It will be apparent that each of the exclusive-OR circuits 68a,68b–68e provides a signal to the respective output 52a,52b–52e when only one of the paired AND circuits connected to inputs of the respective exclusive OR circuit is providing an output at the relatively high level "1".

As previously mentioned, the multivibrators 65a,65b–65f are provided with turned-on periods $T_a$ of successively reduced durations, and it will be appreciated that such turned-on periods $T_a$ can be selected so that outputs appear at the output terminals 52a,52b–52f of discriminator 52 only when the speed of rotation of wheel 42 is in the speed ranges 0 to X, X to 2X, 2X to 3X, 3X to 4X, 4X to 5X, and greater than 5X, respectively.

It will be apparent that, when the above described apparatus according to this invention is in its track searching mode of operation, manual rotation of wheel 42 will cause movement of tape T at a speed, and in the direction dependent upon the speed and direction of rotation of wheel 42. Thus, there will appear, on the screen of a monitor connected to output terminal 31, successive fields of video pictures changing at a rate dependent on the speed of rotation of wheel 42, and with the order of such successively appearing fields being either the same as, or the reverse of the order in which such fields were recorded in dependence on the direction of rotation of wheel 42. By observing the successively appearing fields of the video pictures on the screen of the monitor and suitably varying the direction and speed of rotation of wheel 42, a track on tape T containing precisely the desired field of video signal information can be accurately positioned for scanning by heads 1 and 2, for example, for reproduction of a still picture or for the commencement of an editing operation. In this connection, it is to be noted that, by reason of the substantially friction-free mounting of shaft 44 and the presence of fly-wheel 45 thereon, during the precise locating of a desired field of video information on tape T, relatively slow rotation of wheel 42 can be manually initiated and, thereafter, wheel 42 can be allowed to free-wheel at the slow speed of rotation until the desired field of the video picture appears on the monitor screen. At that time, further turning of wheel 42 can be instantaneously halted merely by gripping wheel 42 so as to achieve the desired still reproduction of the selected field.

Further, since the speed of movement of tape T relative to the rotational speed of wheel 42, that is, the ratio of the tape speed to the rotational speed of wheel 42, is increased as the rotational speed of wheel 42 increases through the successive speed ranges described with reference to FIG. 2A, it is apparent that the tape T can be easily transferred at high speed between reels 5 and 6. In connection with the foregoing, it will be noted that the capstan 9 and its drive motor 10 do not participate in effecting the high speed movement of the tape, that is, such high speed movement is effected only by driving reel 5 or reel 6, whereby to avoid undesirable wearing of the tape, as when the latter is driven at high speed between capstan 9 and pinch roller 11, and further to avoid the necessity of undesirably providing capstan drive motor 10 with a very wide range of operating speeds.

In the illustrated embodiment of the invention, the reel drive motors 7 and 8 have been described as being DC motors and, hence, the illustrated drive control circuits for such motors 7 and 8 are suitable for such purpose. However, the reel drive motors 7 and 8 may be 3-phase induction motors, in which case the control circuits therefor would be suitably modified so as to provide drive signals for the motors 7 and 8 which have their frequencies or the like controlled for varying the directions and speeds of rotation of the reels 5 and 6.

It is further to be noted that a magnetic tape video signal reproducing apparatus having a track searching arrangement according to this invention, as described above, may also be provided with the usual fast-forward and rewind modes of operation. Thus, when a very substantial length of the tape T is to be transferred from one of the reels 5 and 6 to the other without the necessity of viewing the successive fields of video pictures on the screen of a monitor connected to output terminal 31, such transfer may be effected at high speed by selecting the fast-forward or rewinding mode of operation, as in the usual VTR.

Finally, in a magnetic tape video signal reproducing apparatus having a track searching arrangement according to this invention, the relatively low speed movements of the tape in the track searching mode of operation may be effected in response to manual rotation of the wheel 42, as described above, while the previously mentioned known joy-stick control may be additionally provided for effecting the relatively high speed movements of the tape in the track searching mode of operation.

Although an illustrative embodiment of the invention and a number of modifications thereof have been specifically described herein with reference to the accompanying drawings, it is to be understood that the invention is not limited to that precise embodiment or the described modifications thereof, and that various additional modifications and variations may be effected therein by one skilled in the art without departing from the scope or spirit of the invention as defined in the appended claims.

What is claimed is:

1. Apparatus for reproducing video signals recorded in successive parallel tracks on a magnetic tape, said tracks being disposed at an angle with respect to the direction of advancement of the tape, comprising:
   magnetic signal sensing means for reproducing the video signals recorded in each of said tracks upon positioning of said tape for scanning of the respective track by said sensing means;
   tape transport means for transporting said tape relative to said sensing means and thereby causing the latter to scan said tracks in succession for reproducing the video signals respectively recorded therein at a rate dependent on the speed at which the tape is transported; and
   track searching means including a manually rotatable wheel, and control means sensing changes in the rotational position of said wheel and providing signals in response to such changes for regulating the speed at which the tape is transported by said tape transport means in dependence on the speed of rotation of said manually rotatable wheel.

2. Apparatus according to claim 1; in which said control means further includes means for detecting the direction of the rotation of said manually rotatable wheel, and means for determining the direction in which the tape is transported by said tape transport means in dependence on the detected direction of rotation of said manually rotatable wheel.

3. Apparatus according to claim 1; in which said track searching means includes fly-wheel means rotatably coupled with said manually rotatable wheel.

4. Apparatus for reproducing video signals recorded in successive parallel tracks on a magnetic tape, in which said tape is wound on supply and take-up reels, comprising:

magnetic signal sensing means for reproducing the video signals recorded in each of said tracks upon positioning of said tape for scanning of the respective track by said sensing means, said magnetic signal sensing means scanning the tape at a run thereof intermediate said reels:

tape transport means for transporting said tape relative to said sensing means and thereby causing the latter to scan said tracks in succession for reproducing the video signals respectively recorded therein at a rate dependent on the speed at which the tape is transported, said tape transport means including reel drive means for rotating said reels so as to unwind and wind the tape thereon, a capstan engageable with said run of the tape intermediate the reels, capstan drive means for rotating said capstan, and a pinch roller operative to press the tape against said capstan for transport of the tape by the capstan; and track searching means including a manually rotatable wheel, and control means for regulating the speed at which the tape is transported by said tape transport means in dependence on the speed of rotation of said manually rotatable wheel, said control means being operative to regulate the speeds of rotation of said reel drive means and of said capstan drive means in dependence on the speed of rotation of said manually rotatable wheel.

5. Apparatus according to claim 4; in which said capstan drive means includes a variable speed capstan drive motor, and said control means includes means responsive to the rotation of said manually rotatable wheel at low speeds below a predetermined level for relatively reducing an operating voltage applied to said motor so as to avoid damage to the latter during its corresponding slow speed operation.

6. Apparatus according to claim 4; in which said track searching means further includes means for causing said pinch roller to be inoperative to press the tape against said capstan when said speed of rotation of the manually rotatable wheel exceeds a predetermined speed so that the speed of transport of the tape is thereafter dependent on the speed of rotation of said reel drive means as regulated by said control means.

7. Apparatus according to claim 6; in which said control means includes means for causing the speeds of rotation of said reel drive means and said capstan drive means to vary proportionately with the speed of rotation of said manually rotatable wheel at speeds of the latter up to said predetermined speed, and means for providing successively increased speeds of rotation of said reel drive means in response to said wheel being manually rotated at speeds within respective successively increased speed ranges greater than said predetermined speed.

8. Apparatus according to claim 7; in which said control means further includes means for detecting the direction of the rotation of said manually rotatable wheel, and means for determining the direction in which the tape is transported by said tape transport means in dependence on the detected direction of rotation of said manually rotatable wheel.

9. Apparatus for reproducing video signals recorded in successive parallel tracks on a magnetic tape, comprising:

magnetic signal sensing means for reproducing the video signals recorded in each of said tracks upon positioning of said tape for scanning of the respective track by said sensing means;

tape transport means for transporting said tape relative to said sensing means and thereby causing the latter to scan said tracks in succession for reproducing the video signals respectively recorded therein at a rate dependent on the speed at which the tape is transported; and track searching means including a manually rotatable wheel, and control means for regulating the speed at which the tape is transported by said tape transport means in dependence on the speed of rotation of said manually rotatable wheel, said control means including first and second signal generating means providing first and second pulse signals of different phases at a frequency dependent on the speed of rotation of said wheel with the phase relation of said first and second pulse signals being dependent on the direction of said wheel, means for controlling the speed at which the tape is transported by said tape transport means in dependence on said frequency of the first and second pulse signals, and means for controlling the direction in which the tape is transported by said tape transport means in dependence on said phase relation of said first and second pulse signals.

10. Apparatus for reproducing video signals recorded in successive parallel tracks on a magnetic tape which is wound on first and second reels, comprising:

magnetic signal sensing means for reproducing the video signals recorded in each of said tracks upon positioning of said tape for scanning of the respective track by said sensing means, said magnetic signal sensing means scanning the tape at a run thereof between said reels;

tape transport means for transporting said tape relative to said sensing means and thereby causing the latter to scan said tracks in succession for reproducing the video signals respectively recorded therein at a rate dependent on the speed at which the tape is transported, said tape transport means including first and second electric motors for rotating said first and second reels so as to unwind and wind the tape thereon, a rotatable capstan engageable with said run of the tape, a third electric motor for rotating said capstan, a pinch roller and electro-magnetic means energizable to press said pinch roller against said capstan with the tape therebetween for transport of the tape by the capstan; and track searching means including a manually rotatable wheel, and control means for regulating the speed at which the tape is transported by said tape transport means in dependence on the speed of rotation of said manually rotatable wheel, said control means including signal generating means providing first and second pulse signals of different phases at a frequency dependent on the speed of rotation of said wheel with the phase relation of said first and second pulse signals being dependent on the direction of rotation of said wheel, means for controlling the direction of rotation of said reels and capstan by said first and second motors and said third motor, respectively, in dependence on said phase relation to said first and second pulse signals, and means responsive to said frequency of said first and second pulse signals for energizing said electromagnetic means and thereby pressing said pinch roller against said capstan only when said frequency corresponds to speeds of rotation of said wheel below a predetermined speed.

11. Apparatus according to claim 10; in which said control means further comprises means responsive to said frequency for applying a relatively reduced operating voltage to said third motor when said frequency corresponds to speeds of rotation of said wheel below a second predetermined speed which is substantially less than the first mentioned predetermined speed.

12. Apparatus according to claim 10; in which said means for controlling the speeds of operation of said motors includes means for causing the speeds of operation of said first, second and third motors to vary continuously in proportion with changes in said frequency over a first range of the latter corresponding to speeds of rotation of said wheel below said predetermined speed, and means operative in response to said frequency being in a plurality of frequency ranges successively greater than said first range for establishing respective substantially constant successively increased speeds of operation of said first and second motors.

13. Apparatus according to claim 12; in which said respective speeds of operation of said first and second motors for said plurality of frequency ranges have successively increased ratios relative to the corresponding speeds of rotation of said wheel.

14. Apparatus for reproducing video signals recorded in successive parallel tracks on a magnetic tape, comprising:

magnetic signal sensing means for reproducing the video signals recorded in each of said tracks upon positioning of said tape for scanning of the respective track by said sensing means;

tape transport means for transporting said tape relative to said sensing means and thereby causing the latter to scan said tracks in succession for reproducing the video signals respectively recorded therein at a rate dependent on the speed at which the tape is transported; and track searching means including a manually rotatable wheel, and control means for regulating the speed at which the tape is transported by said tape transport means in dependence on the speed of rotation of said manually rotatable wheel, said control means including means for causing the speed at which the tape is transported by said tape transport means to be continuously variable in proportion to the speed of rotation of said wheel over a first range of speeds of rotation of said wheel, and means for causing said tape transport means to transport the tape at successively increased, substantially constant speeds in response to speeds of rotation of said wheel in respective speed ranges successively greater than said first range.

15. Apparatus according to claim 14; in which said successively increased, substantially constant speeds of transport of the tape have successively increased ratios relative to the corresponding speeds of rotation of said wheel.

* * * * *